United States Patent
Kitagawa et al.

(10) Patent No.: US 8,413,302 B2
(45) Date of Patent: Apr. 9, 2013

(54) MAGNETIC HINGE FOR ELECTRONIC DEVICES

(75) Inventors: Wataru Kitagawa, Fujisawa (JP); Shigeru Yuzawa, Yamato (JP); Seita Horikoshi, Zama (JP)

(73) Assignee: Lenova (Singapore) Pte. Ltd., Singapore (SG)

( * ) Notice: Subject to any disclaimer, the term of this patent is extended or adjusted under 35 U.S.C. 154(b) by 847 days.

(21) Appl. No.: 12/332,830

(22) Filed: Dec. 11, 2008

(65) Prior Publication Data
US 2009/0144934 A1   Jun. 11, 2009

(30) Foreign Application Priority Data
Dec. 11, 2007   (JP) .................................. 2007-319291

(51) Int. Cl.
*E05D 11/10* (2006.01)
(52) U.S. Cl. ..................................... 16/320; 16/DIG. 14
(58) Field of Classification Search .................... 16/319, 16/320, DIG. 14
See application file for complete search history.

(56) References Cited

U.S. PATENT DOCUMENTS

| | | | | |
|---|---|---|---|---|
| 2,359,656 A * | 10/1944 | Lurtz | ............................. | 368/126 |
| 5,125,131 A * | 6/1992 | Leblanc | ......................... | 16/330 |
| 6,341,407 B1 * | 1/2002 | Hayashida | ....................... | 16/342 |
| 6,424,245 B1 * | 7/2002 | Rector et al. | ................... | 335/220 |
| 6,516,495 B1 * | 2/2003 | Michalak | ........................ | 16/320 |
| 6,630,878 B2 * | 10/2003 | Pan et al. | ....................... | 335/285 |
| 6,823,561 B2 * | 11/2004 | Park et al. | ........................ | 16/320 |
| 6,876,872 B2 * | 4/2005 | Ko | ................................. | 455/572 |
| 7,016,492 B2 * | 3/2006 | Pan et al. | ................. | 379/433.13 |
| 7,140,071 B2 * | 11/2006 | Tonogai | ........................... | 16/325 |
| 2002/0052228 A1 * | 5/2002 | Ko | ................................. | 455/574 |
| 2005/0166363 A1 * | 8/2005 | Hoffman | .......................... | 16/244 |
| 2005/0194384 A1 * | 9/2005 | Petit | .............................. | 220/230 |
| 2005/0236848 A1 * | 10/2005 | Kim | .............................. | 292/251.5 |
| 2007/0267283 A1 * | 11/2007 | Hiroe et al. | .................... | 200/179 |

FOREIGN PATENT DOCUMENTS

| | | |
|---|---|---|
| JP | H08-116185 | 5/1996 |
| JP | 08-217290 | 8/1996 |
| JP | 2001-065543 | 3/2001 |
| JP | 2004314796 | 11/2004 |
| JP | 2006-112523 | 4/2006 |

* cited by examiner

*Primary Examiner* — Roberta Delisle
(74) *Attorney, Agent, or Firm* — Ference & Associates LLC

(57) ABSTRACT

The invention broadly contemplates an apparatus that makes it possible to easily lift up and open a notebook type computer cover irrespective of a weight of the cover and stop the cover at a predetermined opened/closed position. A portable electronic apparatus includes: a main body provided with an input operating portion, a cover provided with a display unit, a hinge mechanism including a rotary shaft fixed to the cover and a support member fixed to the main body. The apparatus includes an electromagnetic mechanism having a permanent magnet and an electromagnet, in which the permanent magnet and the electromagnet are disposed with respect to the rotary shaft so that when the current is applied or not applied to the electromagnet, a repulsive or attractive force is generated which allows the rotary shaft to be in a rotatable state, and thereby allow an opening/closing torque to act on the cover.

18 Claims, 4 Drawing Sheets

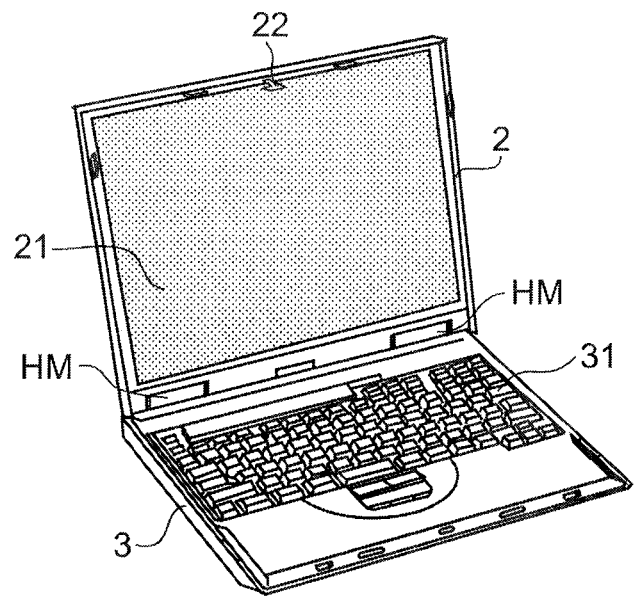
FIG. 4A
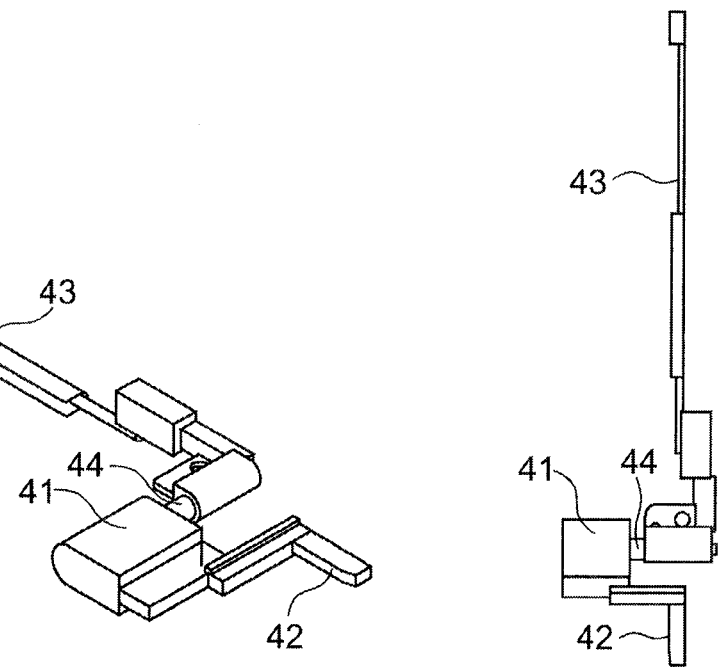
FIG. 4B
FIG. 4C

MAGNETIC HINGE FOR ELECTRONIC DEVICES

CLAIM FOR PRIORITY

This application claims priority from Japanese Application Patent Application No. 2007-319291, filed on Dec. 11, 2007, and which is fully incorporated by reference as if set forth herein.

FIELD OF THE INVENTION

The present invention generally relates to a portable electronic apparatus capable of controlling an opening/closing torque.

BACKGROUND OF THE INVENTION

As an example of a hinge mechanism HM, there is taught in Japanese Patent Application (Laid-Open) No. 8-116185 a torque hinge device which includes a bearing portion provided to a casing of a liquid crystal portion, a shaft portion provided to a casing of a main body portion and rotatably inserted into the bearing portion in a state where a frictional resistance is generated, and a ring-shaped elastic member fixedly fitted to a groove portion provided along a circumferential direction of the bearing portion. An unevenness is formed on an inside surface of the bearing portion and an outside surface of the elastic member so that the surfaces interlock with each other.

In the torque hinge device, when the casing of the liquid crystal portion is opened and closed, since the unevenness having a smooth curved shape is formed on the inside surface of the bearing portion and the outside surface of the elastic member to interlock with each other, the elastic member rotates with a convex portion on the outside surface thereof being repeatedly extended or contracted by a convex portion on the inside surface of the bearing portion. Therefore, it is possible to perceive a sense of lock-feeling at a position where the unevenness of the inside surface of the bearing portion and the outside surface of the elastic member interlock with each other. Moreover, since the frictional resistance is always generated between the inside surface of the bearing portion and the outside surface of the elastic member when the casing of the liquid crystal portion is rotated, it is possible to obtain an opening/closing torque.

As another example of a hinge mechanism HM, there is taught in Japanese Patent Application (Laid-Open) No. 2001-065543 an opening/closing torque variable tilt hinge which includes a bearing cylinder provided to a cover and having an end portion thereof fixed to an attachment arm, a shaft provided to a device body and rotatably inserted into the bearing cylinder, four coil springs mounted on an outer circumference of the shaft and having an outwardly bent projection at one end thereof. The bearing cylinder has formed therein a slit in which the projection is fixed in an opposing and closely contacting state so that a winding direction of a set of coil springs is reversed and a notch which engages with the projection in an opposing and closely contacting state while allowing the projection to rotate by a predetermined angle so that the other set of the coil springs is reversed.

In the opening/closing torque variable tilt hinge, since the bearing cylinder is rotated through the intervention of the attachment arm in response to an opening/closing of the cover, the respective coil springs fasten the shaft by the rotation of the bearing cylinder, and thus an opening/closing torque is generated by a frictional resistance. Since the attachment directions of the pair of coil springs are different, either an opening torque or a closing torque is always generated by the coil springs when the cover is opened or closed. Moreover, when the cover is opened by a predetermined angle, the cover can be easily lifted up by the opening/closing torque of a set of coil springs. When the cover is lifted up by more than the predetermined angle, the opening/closing torque of the other set of coil springs is increased. Therefore, it is possible to vary the opening/closing torque when the cover is opened and closed.

As a further example of a hinge mechanism HM, there is taught in Japanese Patent Application (Laid-Open) No. 2006-112523 a hinge mechanism which includes a shaft member in which magnetic poles are arranged in the order of N, S and N in the circumferential direction of an outer circumference thereof and a rotary member in which magnetic poles are arrange in the order of S, N and S in the circumferential direction of an inner circumference thereof, and in which the magnetic pole portion of the shaft member is inserted. The hinge mechanism is capable of determining the position of the rotary member at an arbitrary position during the rotation without using any mechanical mechanism.

In recent years, a display unit incorporated into a cover of the notebook PC has become larger in its size. Since a weight of the cover increases when the size of the display unit increases, the cover is likely to fall down. The opening/closing torque needs to be set high.

However, in the torque hinge device of Japanese Patent Application (Laid-Open) No. 8-116185 and the tilt hinge of Japanese Patent Application (Laid-Open No. 2001-065543), since the opening/closing torque is generated by the frictional resistance, when the opening/closing torque is set high, there may occur an occasion in which the main body is lifted up together with the cover by an operating force for opening the cover. Therefore, there was a drawback that it is difficult to lift up the cover with one hand.

In the hinge mechanism of Japanese Patent Application (Laid-Open No. 2006-112523), since the position of the cover is determined by not the frictional resistance but an attractive force of opposing permanent magnets, it may be possible to lift up the cover with one hand even when the size of the display unit is increased. However, it was difficult for the permanent magnet to control the opening/closing torque.

Thus, a need has been recognized for a hinging device that addresses the shortcomings of conventional hinge devices, as outlined above.

SUMMARY OF THE INVENTION

The present invention generally relates to a portable electronic apparatus including a main body provided with an input operating portion and a hinge mechanism for connecting a cover provided with a display to the main body so as to be relatively opened and closed. More particularly, the present invention relates to a portable electronic apparatus capable of controlling an opening/closing torque.

In accordance with at least one presently preferred embodiment of the invention, there is broadly contemplated herein a portable electronic apparatus capable of making it possible to easily lift up a cover to be opened irrespective of a weight of the cover and stop the cover at a predetermined opened/closed position to be held. The portable electronic apparatus according to at least one presently preferred embodiment of the invention provides a rotary shaft of a hinge mechanism (connecting a cover to a main body so as to be opened and closed) is controlled by an electromagnetic mechanism having an electromagnet. The electromagnetic mechanism has the electromagnet arranged to give a frictional resistance to the rotary shaft and controls an exciting current to the electromagnet to thereby vary a magnitude of the frictional resistance so that an opening/closing torque acting on the cover is adjusted. Moreover, the electromagnetic mechanism may have a permanent magnet that cooperates with the electromagnet to give the frictional resistance to the rotary shaft.

In summary, one aspect of the invention an apparatus comprising: a main body of an electronic device; a cover of an electronic device; a hinge mechanism of the electronic device, the hinge mechanism comprising: a rotary shaft fitted between the main body and the cover; and an electromagnetic mechanism, the electromagnetic mechanism being disposed to selectively adjust a rotational resistance of the rotary shaft.

An additional aspect of the invention provides an apparatus comprising: a hinge mechanism fitted between a main body and a cover of an electronic device, the hinge mechanism comprising: a rotary shaft; and an electromagnetic mechanism, the electromagnetic mechanism being disposed to selectively adjust a rotational resistance of the rotary shaft.

For a better understanding of the present invention, together and with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 4(A-C) shows a hinge mechanism used in a notebook PC.

DETAILED DESCRIPTION OF THE INVENTION

Figure 1A:
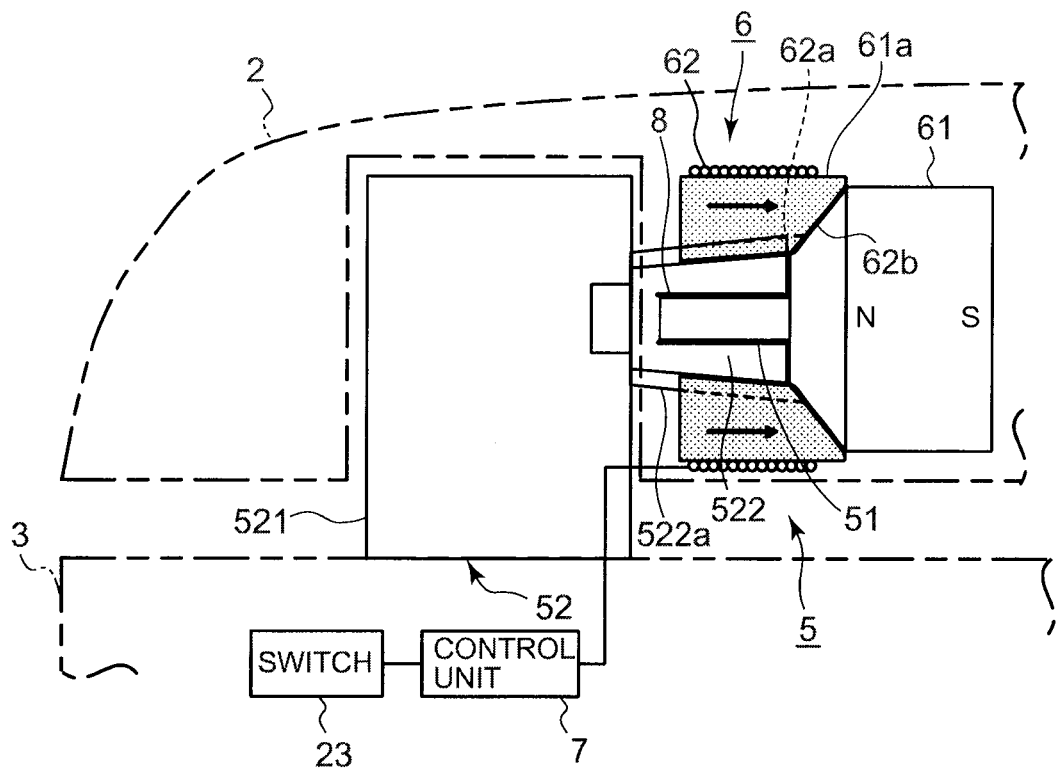
FIG. 1(A-B) shows views explaining the operation of a portable electronic apparatus according to one embodiment of the present invention.

It will be readily understood that the components of the present invention, as generally described and illustrated in the Figures herein, may be arranged and designed in a wide variety of different configurations. Thus, the following more detailed description of the embodiments of the apparatus of the present invention, as represented in the figures, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices that are consistent with the invention as claimed herein.

FIGS. 4A to 4C are views illustrating a notebook type personal computer ("notebook PC"), in which FIG. 4A is an overall perspective view of the notebook PC, FIG. 4B is a perspective view of a hinge mechanism, and FIG. 4C is a top plan view of the hinge mechanism. As illustrated in FIG. 4A, the notebook PC 1 is provided with a cover 2 having incorporated therein a display unit 21 configured as an liquid crystal display or the like that presents information to a user, a main body 3 having incorporated therein a keyboard 31 allowing the user to input information, and a hinge mechanism HM for connecting the cover 2 to the main body 3 to be opened and closed.

As illustrated in FIGS. 4B and 4C, the hinge mechanism HM has a configuration in which an attachment base 42 integral with a bearing portion 41 is fixed to the main body 3, an attachment arm 43 integral with a rotary shaft 44 inserted into the bearing portion 41 is fixed to the cover 2, and the bearing portion 41 and the rotary shaft 44 generate an opening/closing torque when the cover 2 and the main body 3 are opened and closed. When the cover 2 is opened and closed, the attachment arm 43 is also moved in response to the opening/closing operation, and thus, the rotary shaft 44 integral with the attachment arm 43 rotates within the bearing portion 41, thereby generating the opening/closing torque. The hinge mechanism HM is usually provided on both left and right side surfaces of the cover 2 and the main body 3.

A portable electronic apparatus according to the present invention is applied to the notebook PC described above, and particularly, relates to the hinge mechanism HM (FIGS. 4A to 4C).

In accordance with an embodiment of the instant invention, an electromagnetic mechanism includes a pair of divided support members obtained by dividing a support member in which the rotary shaft is rotatably fitted, a holding member configured to hold at least one of the pair of divided support members to be movable in a direction perpendicular to the rotary shaft, the permanent magnet provided to the one divided support member, the electromagnet provided to the other divided support member and disposed to oppose the permanent magnet with the rotary shaft disposed there between, and a latch mechanism provided with a toothed gear configured to interlock with an inner circumferential surface of each of the pair of divided support members and an outer circumferential surface of the rotary shaft.

According to one embodiment of the instant invention, when a current is not applied to the electromagnet, the electromagnet is attracted by an attractive force of the permanent magnet, and thus, the toothed gears of the pair of divided support members interlock with the toothed gear of the rotary shaft. As a result, it is possible to fix the rotary shaft at a non-rotatable state. On the other hand, when a current is applied to the electromagnet, a force is generated in a direction where the magnetic poles of the electromagnet and the magnetic poles of the permanent magnet repel each other, and thus, the toothed gears of the pair of divided support members are separated from the toothed gear of the rotary shaft. As a result, it is possible to allow the rotary shaft to be in a rotatable state. Moreover, by controlling the exciting current to the electromagnet, it is possible to switch the generation of the attractive force and the repulsive force by the electromagnet and the permanent magnet.

According to one embodiment of the instant invention, the permanent magnet is fixed to a fixed end of the rotary shaft so that two different magnetic poles are arranged along an axial direction of the rotary shaft, and the electromagnet is provided to a support member in which the rotary shaft is rotatably fitted so that it can reciprocate along the axial direction of the rotary shaft, the electromagnet being arranged so that two different magnetic poles are generated along the axial direction of the rotary shaft.

According to one embodiment of the instant invention, when a current is not applied to the electromagnet, the electromagnet is attracted by an attractive force of the permanent magnet, and thus, the electromagnet is moved on the support member in the axial direction of the rotary shaft to be attached to the permanent magnet. As a result, it is possible to fix the rotary shaft at a non-rotatable state. On the other hand, when a current is applied to the electromagnet, a force is generated in a direction where the magnetic poles of the electromagnet and the magnetic poles of the permanent magnet repel each other, and thus, the electromagnet is attracted by an attractive force of the permanent magnet, and thus, the electromagnet is moved on the support member in the axial direction of the rotary shaft to be separated from the permanent magnet. As a result, it is possible to allow the rotary shaft to be in a rotatable state. Moreover, by controlling the exciting current to the electromagnet, it is possible to switch the generation of the attractive force and the repulsive force by the electromagnet and the permanent magnet.

In accordance with the above-mentioned diverse aspects of the present invention, it is possible to provide a portable electronic apparatus capable of making it possible to easily lift up a cover to be opened irrespective of a weight of the cover and stop the cover at a predetermined opened/closed position to be held. Further, it is possible to provide a portable electronic apparatus capable of controlling an opening/closing torque of a cover to thereby realizing a smooth and delicate opening/closing operation.

Figure 1B:
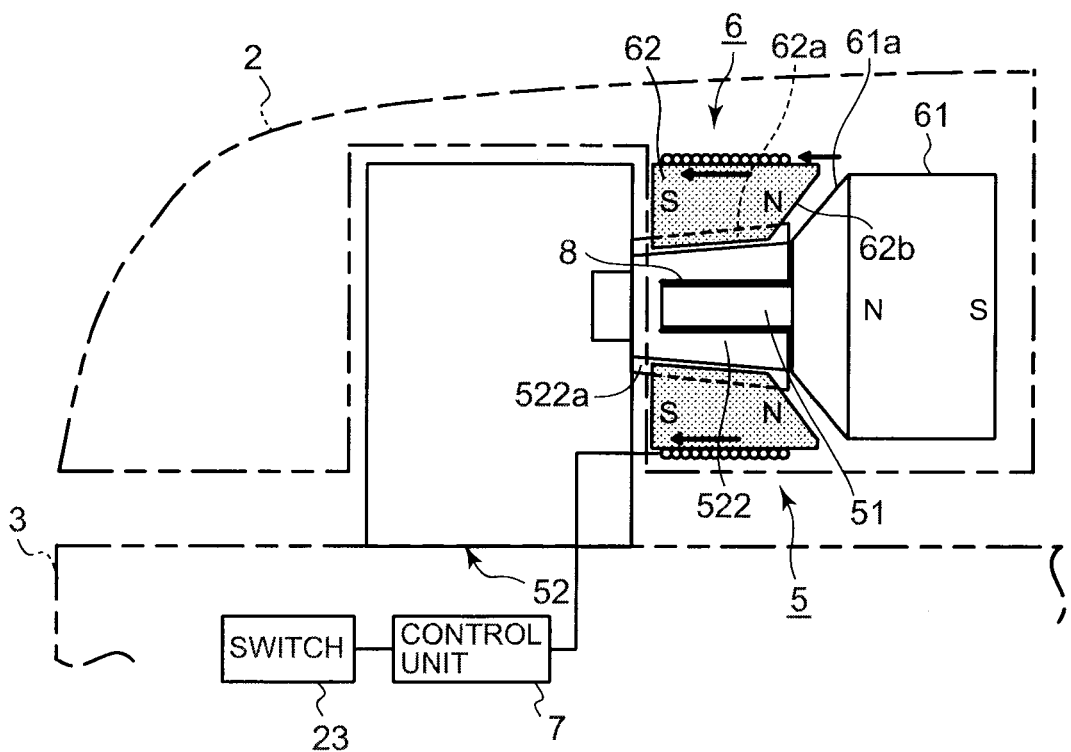
Figure 2:
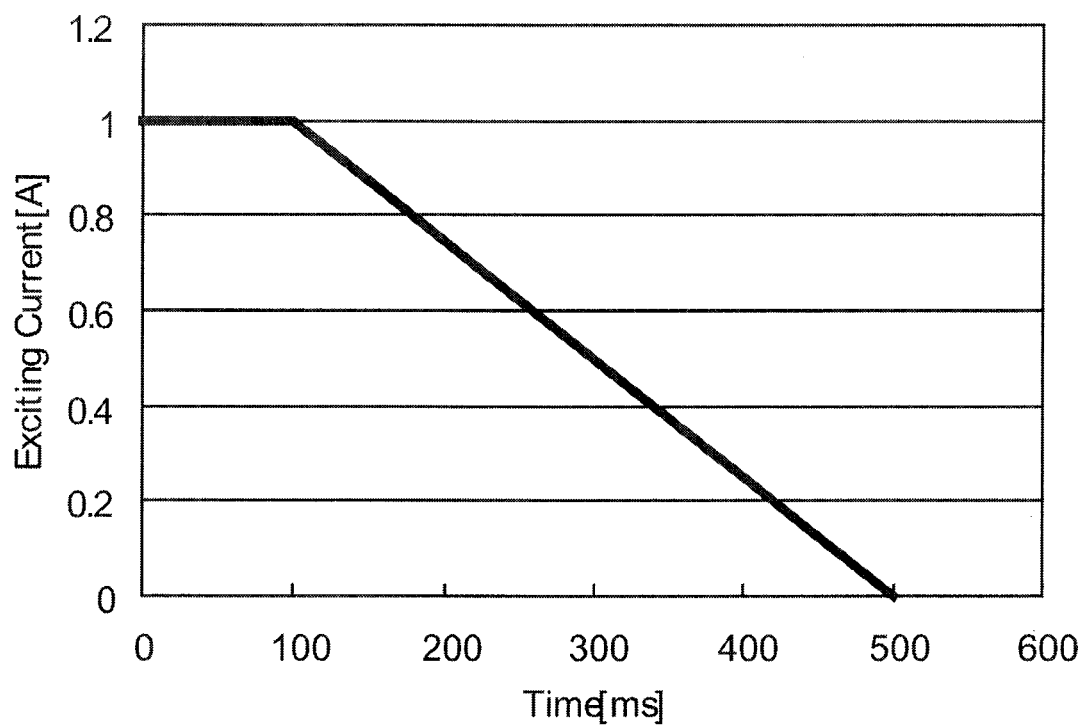
FIG. 2 is a graph showing a change in an exciting current by a current control function of a control unit provided in the portable electronic apparatus according to one embodiment of the present invention.

FIGS. 1A to 1B are views for explaining the operation of a portable electronic apparatus according to an embodiment of the present invention, in which FIG. 1A is a view showing an electromagnet of an electromagnetic mechanism in a non-operating state, and FIG. 1B is a view showing the electromagnet in an operating state. FIG. 2 is a graph showing a change in an exciting current by a current control function of a control unit provided in the portable electronic apparatus according to the present invention. Throughout the embodiments of the present invention, similar or identical components will be denoted by the same reference numerals.

As outlined above, a portable electronic apparatus according to one embodiment of the present invention is applied to the notebook PC 1 described above, and particularly, relates to the hinge mechanism HM (FIGS. 4A to 4C). As illustrated in FIGS. 1A and 1B, the portable electronic apparatus according to one embodiment of the present invention is provided with a hinge mechanism 5 for connecting a cover 2 to a main body 3 and an electromagnetic mechanism 6 for controlling an opening/closing torque of the hinge mechanism 5.

The hinge mechanism 5 has a rotary shaft 51 incorporated into the cover 2 and a support member 52 incorporated into the main body 3. The support member 52 includes an attachment base 521 fixed to the main body 3 and a bearing portion 522 fixed to the attachment base 521 and in which the rotary shaft 51 is rotatably inserted so that an axial direction thereof becomes parallel to a horizontal direction.

The electromagnetic mechanism 6 has a configuration in which the permanent magnet 61 is fixed to a fixed end of the rotary shaft 51 so that two different magnetic poles are arranged along an axial direction of the rotary shaft 51, and the electromagnet 62 is provided to the bearing portion 522 of the support member 52 so that it can reciprocate along the axial direction of the rotary shaft 51.

The permanent magnet 61 generally has a columnar shape having a diameter larger than that of the rotary shaft 51 and a portion thereof near the rotary shaft 51 has a truncated cone shape formed by a sloped surface 61a that is gradually narrowed as it goes toward the rotary shaft 51. Two magnetic poles of the permanent magnet 61 are defined such that a N pole is directed toward the rotary shaft 51, for example.

The electromagnet 62 is reciprocably fitted to the support member 52. The fitting portion is configured by a convex portion 522a formed on the bearing portion 522 of the support member 52 and a concave portion 62a formed on the electromagnet 62 to be fitted with the convex portion 522a of the bearing portion 522. The electromagnet 62 has approximately the same diameter as an outer diameter of the permanent magnet 61 and a funnel-shaped sloped surface 62b having the same inclination as the sloped surface 61a of the permanent magnet 61 is formed at a portion thereof near the permanent magnet 61.

The portable electronic apparatus having the hinge mechanism 5 and the electromagnetic mechanism 6 is provided with a control unit 7 for controlling the electromagnet 62 by means of an exciting current. By controlling the exciting current to the electromagnet 62 using the control unit 7, it is possible to switch the generation of an attractive force and a repulsive force by the electromagnet 62 and the permanent magnet 61. Moreover, by varying the proportion of the attractive force and the repulsive force by the electromagnet 62 and the permanent magnet 61, it is possible to generate a variable opening/closing torque to the rotary shaft 51.

Moreover, when the cover 2 is provided with a latch hook 22 for latching the cover 2 to the main body 3 when the cover 2 is closed, the portable electronic apparatus having the hinge mechanism 5 and the electromagnetic mechanism 6 may be provided with an electromagnet excitation switch 23 for delivering an electromagnet excitation signal to the control unit 7 when the latch hook 22 is released from the latched state. By having the electromagnet excitation switch 23 that operates in conjunction with a releasing operation of the latch hook 22, when the cover 2 is opened in a state where the latch hook 22 is released from the latched state, since the repulsive force is still generated between the permanent magnet 61 and the electromagnet 62, it is possible to rotate the cover 2.

Furthermore, the control unit 7 may have a current control function of lowering a current value of the exciting current to zero within a predetermined period of time when an input of the electromagnet excitation signal from the electromagnet excitation switch 23 is stopped. By providing the current control function to the control unit 7, when an operator puts the latch hook 22 into a latched state, the exciting current of the electromagnet 62 is decreased, and thus, the repulsive force against the permanent magnet 61 weakens while the attractive force between them strengthens. As a result, the frictional resistance increases, and it is thus possible to increase the opening/closing torque to the rotary shaft 51. Owing to such a configuration, since the opening/closing torque increases as the cover 2 moves closer to a desired opening/closing angle, it is possible to realize a smooth and delicate opening/closing operation.

Moreover, as a method of providing the current control function, as illustrated in FIG. 2, there may be considered a current control expressed by a proportional curve wherein a current value of the exciting current is lowered to zero within a predetermined period of time in a proportional manner, a current control expressed by a stepped curve wherein a current value of the exciting current is lowered to zero within a predetermined period of time in a stepped manner, a current control expressed by an exponential curve wherein a current value of the exciting current is lowered to zero within a predetermined period of time in an exponential manner, and the like.

Furthermore, the opening/closing torque can be increased by increasing an area of a contacting surface between the truncated cone-shaped sloped surface 61a of the permanent magnet 61 and the funnel-shaped sloped surface 62b of the electromagnet 62.

A description of an opening/closing operation of the cover 2 of the notebook PC 1, according to one embodiment of the invention, will be provided. In the description below, it will be assumed that the notebook PC 1 is provided with the latch hook 22 and the electromagnet excitation switch 23 which operates in conjunction with the latch hook 22 and that the control unit 7 has the current control function.

In the notebook PC 1, since the latch hook 22 is in a latched state when the cover 2 is closed, the electromagnet excitation switch 23 is in a turned-off state. In such a case, since the electromagnet excitation signal is not delivered from the electromagnet excitation switch 23 to the control unit 7, a current is not applied to the electromagnet 62 of the electromagnetic mechanism 6. When a current is not applied to the electromagnet 62, the electromagnet 62 is moved on the bearing portion 522 in the axial direction of the rotary shaft 51 to be attached to the permanent magnet 61, and thus, the rotary shaft 51 is fixed at a state where it is not easily rotatable (FIG. 1A). Therefore, the opening/closing torque by the electromagnetic mechanism 6 becomes the maximum.

In the notebook PC 1 in which the cover 2 is in a closed state, when the latch hook 22 is operated to be released from the latched state in order to open the cover 2, the electromagnet excitation switch 23 is turned on, and thus, the electromagnet excitation signal is delivered from the electromagnet excitation switch 23 to the control unit 7. Then, the control unit 7 puts the electromagnet 62 into a state where a current is applied thereto in response to the input of the electromagnet excitation signal. When a current is applied to the electromagnet 62, a force is generated in a direction where the magnetic poles of the electromagnet 62 and the magnetic poles of the permanent magnet 61 repel each other. Therefore, the electromagnet 62 is moved on the bearing portion 522 in the axial direction of the rotary shaft 51 to be separated from the permanent magnet 61. As a result, it is possible to allow the rotary shaft 51 to be in a rotatable state (FIG. 1B). In this case, since the opening/closing torque by the electromagnetic mechanism 6 becomes the minimum, it is possible to easily lift up the cover 2 to be opened irrespective of a weight of the cover 2. Therefore, it is possible to certainly prevent an occasion in which the main body 3 is lifted up together with the cover 2 by an operating force for opening the cover 2.

When the latch hook 22 is operated to be in a latched state at a time point when the opening angle of the cover 2 approaches a desired angle, since the input of the electromagnet excitation signal from the electromagnet excitation switch 23 is stopped, the control unit 7 lowers the current value of the exciting current to zero within a predetermined period of time by means of the current control function. Owing to the current control function, the exciting current of the electromagnet 62 is decreased, and thus, the repulsive force against the permanent magnet 61 weakens while the attractive force between them strengthens. As a result, the frictional resistance increases, and it is thus possible to increase the opening/closing torque to the rotary shaft 51 in a proportional manner. Owing to such a configuration, since the opening/closing torque increases as the cover 2 moves closer to a desired opening angle, it is possible to realize a smooth and delicate opening/closing operation. Moreover, it is possible to stop the cover 2 at a desired opened position to be held at a time point when the opening/closing torque becomes the maximum.

In the notebook PC 1 in which the cover 2 is stopped at a predetermined opening angle to be held, when the latch hook 22 is operated to be released from the latched state in order to close the cover 2, the electromagnet excitation switch 23 is turned on, and thus, the electromagnet excitation signal is delivered from the electromagnet excitation switch 23 to the control unit 7. Then, the control unit 7 puts the electromagnet 62 into a state where a current is applied thereto in response to the input of the electromagnet excitation signal. When a current is applied to the electromagnet 62, a force is generated in a direction where the magnetic poles of the electromagnet 62 and the magnetic poles of the permanent magnet 61 repel each other. Therefore, the electromagnet 62 is moved on the bearing portion 522 in the axial direction of the rotary shaft 51 to be separated from the permanent magnet 61. As a result, it is possible to allow the rotary shaft 51 to be in a rotatable state (FIG. 1B). In this case, since the opening/closing torque by the electromagnetic mechanism 6 becomes the minimum, it is possible to easily close the cover 2.

When the latch hook 22 is operated to be in a latched state at a time point when the closing angle of the cover 2 approaches a desired angle, since the input of the electromagnet excitation signal from the electromagnet excitation switch 23 is stopped, the control unit 7 lowers the current value of the exciting current to zero within a predetermined period of time by means of the current control function. Owing to the current control function, the exciting current of the electromagnet 62 is decreased, and thus, the repulsive force against the permanent magnet 61 weakens while the attractive force between them strengthens. As a result, the frictional resistance increases, and it is thus possible to increase the opening/closing torque to the rotary shaft 51 in a proportional manner. Owing to such a configuration, since the opening/closing torque increases as the cover 2 moves closer to a desired opening angle, it is possible to realize a smooth and delicate closing operation. Moreover, it is possible to close the cover 2 at a time point when the opening/closing torque becomes the maximum.

Although in an embodiment described above, the electromagnet excitation switch 23 for delivering the electromagnet excitation signal to the control unit 7 operates in conjunction with the latch hook 22, the present invention is not limited to such an embodiment, and the same operation and effect can be provided with a switch to the main body 3 so that an operator can operate the switch.

Moreover, although in an embodiment described above, the smooth and delicate opening/closing operation of the cover 2 is realized by the current control function of the control unit 7, the present invention is not limited to such an embodiment, and a rotation angle sensor (not shown) for detecting an opening/closing angle of the cover 2 to deliver an electromagnet excitation signal corresponding to the opening/closing angle to the control unit 7 may be provided. In such a case, the control unit 7 may lower the current value of the exciting current to zero in proportion to the electromagnet excitation signal corresponding to the opening/closing angle from the rotation angle sensor. Therefore, since the opening/closing torque increases as the cover 2 moves closer to a desired opening angle, it is possible to realize a smooth and delicate opening/closing operation.

Furthermore, although in an embodiment described above, the opening/closing torque with a good torque-feeling is imparted by the current control function of the control unit 7, the present invention is not limited to this, but a frictional resistance imparting portion 8 for giving on the rotary shaft 51 the opening/closing torque acting on the cover 2 by means of the frictional resistance may be provided to the hinge mechanism 5. The frictional resistance imparting portion 8 may be disposed in the fitting portion between the rotary shaft 51 and the bearing portion 522, for example. By providing the frictional resistance imparting portion 8 to the hinge mechanism 5, even when the control unit 7 does not have the current control function, it is possible to impart the opening/closing torque with a good torque-feeling by means of the frictional resistance of the frictional resistance imparting portion 8. That is, even when the latch hook 22 is released from the latched state in order to open the cover 2 so that the opening/closing torque becomes the minimum, the opening/closing operation can be realized by means of the frictional resistance of the frictional resistance imparting portion 8.

Figure 3A:
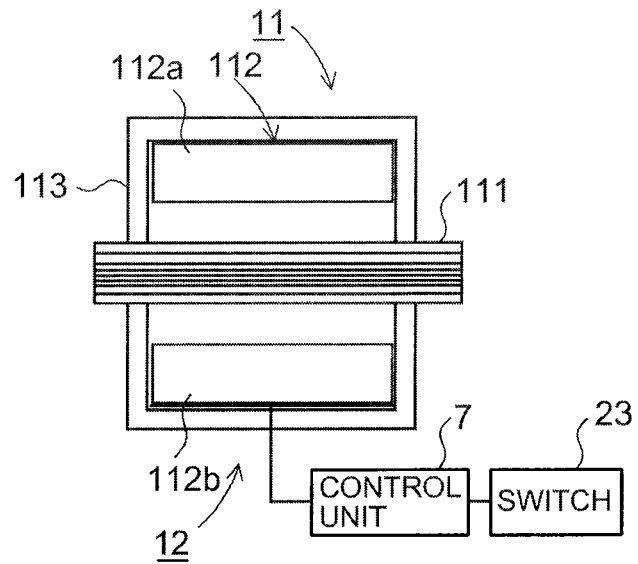
FIG. 3(A-C) shows an operation of a portable electronic apparatus according to one embodiment of the present invention.
Figure 3B:
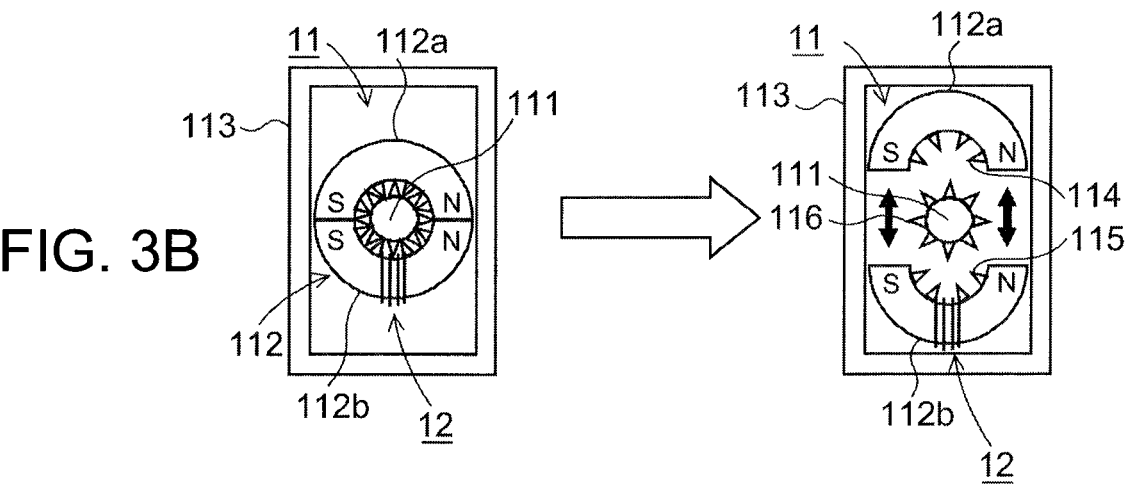
Figure 3C:
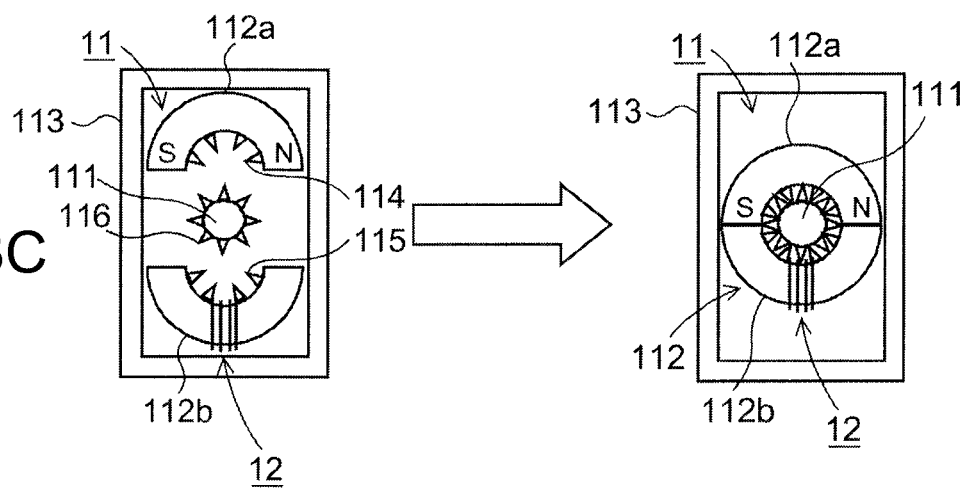

The portable electronic apparatus is not limited to the configuration described in connection with the first embodiment but may has a configuration illustrated in FIGS. 3A to 3C. FIGS. 3A to 3C are views showing an operation of a portable electronic apparatus according to a second embodiment of the present invention, in which FIG. 3A is a front view of a hinge mechanism and an electromagnetic mechanism, FIG. 3B is a side sectional view showing a state where the hinge mechanism is latched by the electromagnetic mechanism, and FIG. 3C is a side sectional view showing a state where the hinge mechanism is released from the state of being latched by the electromagnetic mechanism.

According to an embodiment of the instant invention, as illustrated in FIGS. 3A, 3B and 3C, the portable electronic apparatus according to the present invention is provided with a hinge mechanism 11 for connecting a cover 2 to a main body 3 and an electromagnetic mechanism 12 for controlling an opening/closing torque of the hinge mechanism 11.

The hinge mechanism 11 has a rotary shaft 111 incorporated into the cover 2 so that an axial direction thereof becomes parallel to a horizontal direction and a support member 112 incorporated into the main body 3. The support member 112 includes a pair of divided support members 112a and 112b which is divided into two parts. The support member 112 is provided with a holding member 113 for holding at least one of the pair of divided support members 112a and 112b to be movable in a direction perpendicular to the rotary shaft 111. Moreover, one divided support member 112a is configured as a permanent magnet, and the other divided support member 112b is configured as an electromagnet, so that the other divided support member 112b opposes the divided support member 112a with the rotary shaft 111 disposed between them. It is to be noted that the permanent magnet and the electromagnet may be provided to the divided support member 112a and the divided support member 112b, respectively, as separate bodies.

Furthermore, the hinge mechanism 11 is provided with a latch mechanism 110 in which toothed gears 114 and 115 are formed on inner circumferential surfaces of the pair of divided support members 112a and 112b and a toothed gear 116 is formed on an outer circumferential surface of the rotary shaft 111 so as to interlock with the toothed gears 114 and 115 of the pair of divided support members 112a and 112b. The latch mechanism 110 is configured such that the toothed gears 114 and 115 of the pair of divided support members 112a and 112b interlock with or separate from the toothed gear 116 of the rotary shaft 111 so that only the rotary shaft 111 can rotate.

Similar to an embodiment of the invention wherein the portable electronic apparatus has the hinge mechanism 5 and the electromagnetic mechanism 6, an embodiment of the invention wherein the portable electronic apparatus has the hinge mechanism 11 and the electromagnetic mechanism 12 is provided with the control unit 7 for controlling the electromagnet 62 by means of an exciting current.

Moreover, similar to the portable electronic apparatus having the hinge mechanism 5 and the electromagnetic mechanism 6, the portable electronic apparatus having the hinge mechanism 11 and the electromagnetic mechanism 12 may be provided with the electromagnet excitation switch 23 when the latch hook 22 (FIG. 4A) is provided. Furthermore, the control unit 7 may have a current control function of lowering a current value of the exciting current to zero within a predetermined period of time in a proportional manner when an input of the electromagnet excitation signal from the electromagnet excitation switch 23 is stopped as illustrated in FIG. 2.

In accordance with one embodiment of the invention, a description of an opening/closing operation of the cover 2 of the notebook PC 1, which is a portable electronic apparatus having such a configuration, will be provided. In the description below, it will be assumed that the notebook PC 1 is provided with the latch hook 22 and the electromagnet excitation switch 23 which operates in conjunction with the latch hook 22 and that the control unit 7 has the current control function.

In the notebook PC 1, since the latch hook 22 is in a latched state when the cover 2 is closed, the electromagnet excitation switch 23 is in a turned-off state. In such a case, since the electromagnet excitation signal is not delivered from the electromagnet excitation switch 23 to the control unit 7, a current is not applied to the divided support member 112b being the electromagnet of the electromagnetic mechanism 12. When a current is not applied to the divided support member 112b being the electromagnet, the divided support member 112b is attached to the divided support member 112a being the permanent magnet. Therefore, the toothed gears 114 and 115 of the pair of divided support members 112a and 112b tightly interlock with the toothed gear 116 of the rotary shaft 111, and thus, the rotary shaft 111 is fixed at a state where it is not easily rotatable. Therefore, the opening/closing torque by the electromagnetic mechanism 12 becomes the maximum.

In the notebook PC 1 in which the cover 2 is in a closed state, when the loop filter 22 is operated to be released from the latched state in order to open the cover 2, the electromagnet excitation switch 23 is turned on, and thus, the electromagnet excitation signal is delivered from the electromagnet excitation switch 23 to the control unit 7. Then, the control unit 7 puts the divided support member 112b being the electromagnet into a state where a current is applied thereto in response to the input of the electromagnet excitation signal. When a current is applied to the divided support member 112b being the electromagnet, a force is generated in a direction where the magnetic poles of the divided support member 112b being the electromagnet and the magnetic poles of the divided support member 112a being the permanent magnet repel each other.

Therefore, the toothed gears 114 and 115 of the pair of divided support members 112a and 112b are separated from the toothed gear 116 of the rotary shaft 111. As a result, it is possible to allow the rotary shaft 111 to be in a rotatable state (FIG. 3B). In this case, since the opening/closing torque by the electromagnetic mechanism 12 becomes the minimum, it is possible to easily lift up the cover 2 to be opened irrespective of a weight of the cover 2. Therefore, it is possible to certainly prevent an occasion in which the main body 3 is lifted up together with the cover 2 by an operating force for opening the cover 2.

When the latch hook 22 is operated to be in a latched state at a time point when the opening angle of the cover 2 approaches a desired angle, since the input of the electromagnet excitation signal from the electromagnet excitation switch 23 is stopped, the control unit 7 lowers the current value of the exciting current to zero within a predetermined period of time by means of the current control function. By providing the current variable function to the control unit 7, the exciting current of the divided support member 112b being the electromagnet is decreased, and thus, the repulsive force against the divided support member 112a being the permanent magnet weakens while the attractive force between them strengthens. As a result, a clamping force of the pair of divided support members 112a and 112b applied to the rotary shaft 111 can be changed, and thus, the convex portions of the toothed gears 114 and 115 of the pair of divided support members 112a and 112b can climb over the convex portions of the toothed gear 116 of the rotary shaft 111.

Therefore, it is possible to generate the opening/closing torque by means of the climbing resistance. Owing to such a configuration, since the opening/closing torque increases as the cover 2 moves closer to a desired opening angle, it is possible to realize a smooth and delicate opening/closing operation. Moreover, it is possible to stop the cover 2 at a desired opened position to be held at a time point when the opening/closing torque becomes the maximum.

According to an embodiment of the invention in which the notebook PC 1 in which the cover 2 is stopped at a predetermined opening angle to be held, when the latch hook 22 is operated to be released from the latched state in order to close the cover 2, the electromagnet excitation switch 23 is turned on, and thus, the electromagnet excitation signal is delivered from the electromagnet excitation switch 23 to the control unit 7. Then, the control unit 7 puts the divided support member 112b being the electromagnet into a state where a current is applied thereto in response to the input of the electromagnet excitation signal. When a current is applied to the divided support member 112b being the electromagnet, a force is generated in a direction where the magnetic poles of the divided support member 112b being the electromagnet and the magnetic poles of the divided support member 112a being the permanent magnet repel each other.

Therefore, the toothed gears 114 and 115 of the pair of divided support members 112a and 112b are separated from the toothed gear 116 of the rotary shaft 111. As a result, it is possible to allow the rotary shaft 111 to be in a rotatable state (FIG. 3B). In this case, since the opening/closing torque by the electromagnetic mechanism 12 becomes the minimum, it is possible to easily close the cover 2.

When the latch hook 22 is operated to be in a latched state at a time point when the closing angle of the cover 2 approaches a desired angle, since the input of the electromagnet excitation signal from the electromagnet excitation switch 23 is stopped, the control unit 7 lowers the current value of the exciting current to zero within a predetermined period of time by means of the current control function. Owing to the current control function, the exciting current of the divided support member 112b being the electromagnet is decreased, and thus, the repulsive force against the divided support member 112a being the permanent magnet weakens while the attractive force between them strengthens. As a result, a clamping force of the pair of divided support members 112a and 112b applied to the rotary shaft 111 can be changed, and it is thus possible to increase the opening/closing torque to the rotary shaft 111 in a proportional manner. Owing to such a configuration, since the opening/closing torque increases as the cover 2 moves closer to a desired opening angle, it is possible to realize a smooth and delicate closing operation. Moreover, it is possible to close the cover 2 at a time point when the opening/closing torque becomes the maximum.

Moreover, according to one embodiment of the instant invention, similar to an embodiment described above, the electromagnet excitation switch 23 may be provided to the main body 3, and the rotation angle sensor may be provided as an alternative means of the current control function of the control unit 7.

In addition, the electromagnetic mechanism may be configured by any mechanism as long as it includes a permanent magnet and an electromagnet and in which the permanent magnet and the electromagnet are disposed with respect to a rotary shaft so that when the current is applied to the electromagnet, a repulsive force is generated against the permanent magnet so as to allow the rotary shaft to be in a rotatable state, and when the current is not applied to the electromagnet, the electromagnet is attracted by an attractive force of the permanent magnet so as to generate on the rotary shaft an opening/closing torque acting on the cover. Moreover, the electromagnetic mechanism may be configured by any mechanism as long as it has an electromagnet disposed for giving a frictional resistance on a rotary shaft and is able to adjust an opening/closing torque acting on the cover by means of the magnitude of the frictional resistance. Furthermore, the electromagnetic mechanism may be configured by a mechanism which is provided with a permanent magnet arranged to give the frictional resistance on the rotary shaft in cooperation with the electromagnet.

In addition, the portable electronic apparatus according to an embodiment of the present invention is not limited to the notebook PC but may be applied to any portable electronic apparatus as long as it has a main body and a cover.

While the present invention has been shown and described by way of particular preferred embodiments in conjunction with the drawings, the present invention is not limited to the disclosed embodiments. It is to be understood that the present invention may employ any configurations known in the art as long as they can attain the effects of the present invention.

If not otherwise stated herein, it is to be assumed that all patents, patent applications, patent publications and other publications (including web-based publications) mentioned and/or cited herein are hereby fully incorporated by reference herein as if set forth fully in their entirety herein.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

What is claimed is:
1. An apparatus comprising:
   a main body of an electronic device;
   a cover of an electronic device;
   a hinge mechanism of the electronic device, the hinge mechanism comprising:

a rotary shaft fitted between the main body and the cover; and
an electromagnetic mechanism, the electromagnetic mechanism being disposed to selectively adjust a rotational resistance of the rotary shaft.

2. The apparatus according to claim 1, wherein the electromagnetic mechanism comprises a permanent magnet configured to selectively adjust the rotational resistance in cooperation with an electromagnet.

3. The apparatus according to claim 2, wherein the electromagnetic mechanism is configured selectively adjust the rotational resistance when a current is applied to the electromagnet.

4. The apparatus according to claim 3, wherein the electromagnetic mechanism is configured such that the permanent magnet and the electromagnet create a repulsive force with respect to one another after the current is applied to the electromagnet.

5. The apparatus according to claim 1, wherein the hinge mechanism further comprises:
at least one support member; and
a frictional resistance imparting portion that imparts a frictional resistance to the rotary shaft, the frictional resistance imparting portion being disposed in a fitting portion between the rotary shaft and the at least one support member.

6. The apparatus according to claim 2, further comprising:
a control unit that controls the current; and
an electromagnet switch that delivers an electromagnet excitation signal to the control unit.

7. The apparatus according to claim 6, wherein the cover comprises:
the electromagnet switch; and
a latch hook configured to latch the cover to the main body and switch the electromagnet switch between an on state and an off state.

8. The apparatus according to claim 7, further comprising:
a rotation angle sensor configured to detect an opening/closing angle of the cover and deliver a current to the control unit when the opening/closing angle corresponds to a predetermined opening/closing angle;
wherein the control unit is configured to execute a current control function.

9. The apparatus according to claim 3, wherein the electromagnetic mechanism further comprises:
a pair of divided support members;
a holding member configured to hold at least one of the pair of divided support members so as to be movable in a direction perpendicular to the rotary shaft;
the permanent magnet being disposed about one of the pair of divided support members;
the electromagnet being disposed about another of the pair of divided support members so as to oppose the permanent magnet, wherein the rotary shaft is disposed between the permanent magnet and the electromagnet; and
a latch mechanism comprising a set of gears configured to interlock with an inner circumferential surface of each of the pair of divided support members and an outer circumferential surface of the rotary shaft.

10. An apparatus comprising:
a hinge mechanism fitted between a main body and a cover of an electronic device, the hinge mechanism comprising:
a rotary shaft; and
an electromagnetic mechanism, the electromagnetic mechanism being disposed to selectively adjust a rotational resistance of the rotary shaft.

11. The apparatus according to claim 10, wherein the electromagnetic mechanism comprises a permanent magnet configured to selectively adjust the rotational resistance in cooperation with an electromagnet.

12. The apparatus according to claim 11, wherein the electromagnetic mechanism is configured selectively adjust the rotational resistance when a current is applied to the electromagnet.

13. The apparatus according to claim 12, wherein the electromagnetic mechanism is configured such that the permanent magnet and the electromagnet create a repulsive force with respect to one another after the current is applied to the electromagnet.

14. The apparatus according to claim 10, wherein the hinge mechanism further comprises:
at least one support member; and
a frictional resistance imparting portion that imparts a frictional resistance to the rotary shaft, the frictional resistance imparting portion being disposed in a fitting portion between the rotary shaft and the at least one support member.

15. The apparatus according to claim 11, further comprising:
a control unit that controls the current; and
an electromagnet switch that delivers an electromagnet excitation signal to the control unit.

16. The apparatus according to claim 15, wherein the cover comprises:
the electromagnet switch; and
a latch hook configured to latch the cover to the main body and switch the electromagnet switch between an on state and an off state.

17. The apparatus according to claim 16, further comprising:
a rotation angle sensor configured to detect an opening/closing angle of the cover and deliver a current to the control unit when the opening/closing angle corresponds to a predetermined opening/closing angle;
wherein the control unit is configured to execute a current control function.

18. The apparatus according to claim 12, wherein the electromagnetic mechanism further comprises:
a pair of divided support members;
a holding member configured to hold at least one of the pair of divided support members so as to be movable in a direction perpendicular to the rotary shaft;
the permanent magnet being disposed about one of the pair of divided support members;
the electromagnet being disposed about another of the pair of divided support members so as to oppose the permanent magnet, wherein the rotary shaft is disposed between the permanent magnet and the electromagnet; and
a latch mechanism comprising a set of gears configured to interlock with an inner circumferential surface of each of the pair of divided support members and an outer circumferential surface of the rotary shaft.

* * * * *